United States Patent
Wagner et al.

(10) Patent No.: US 10,836,156 B2
(45) Date of Patent: Nov. 17, 2020

(54) FLUID EJECTION DEVICE CAPPING

(71) Applicant: Hewlett-Packard Development Company, L.P., Spring, TX (US)

(72) Inventors: Timothy Wagner, Corvallis, OR (US); Hyoen-Mu Yoo, San Diego, CA (US); Bruce A. Stephens, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/331,770

(22) PCT Filed: Oct. 5, 2016

(86) PCT No.: PCT/US2016/055422
§ 371 (c)(1),
(2) Date: Mar. 8, 2019

(87) PCT Pub. No.: WO2018/067132
PCT Pub. Date: Apr. 12, 2018

(65) Prior Publication Data
US 2019/0217604 A1     Jul. 18, 2019

(51) Int. Cl.
*B41J 2/045* (2006.01)
*B41J 2/165* (2006.01)
*G06F 3/12* (2006.01)

(52) U.S. Cl.
CPC ......... *B41J 2/0451* (2013.01); *B41J 2/0457* (2013.01); *B41J 2/16508* (2013.01); *G06F 3/121* (2013.01); *B41J 2002/16573* (2013.01)

(58) Field of Classification Search
CPC .... B41J 2/0451; B41J 2/0457; B41J 2/16508; B41J 2002/16573
See application file for complete search history.

(56) References Cited

U.S. PATENT DOCUMENTS

| 5,117,244 A | 5/1992 | Yu |
| 7,984,962 B2 | 7/2011 | Berry et al. |

(Continued)

FOREIGN PATENT DOCUMENTS

| CN | 1756663 | 4/2006 |
| EP | 0845361 | 8/1998 |

(Continued)

OTHER PUBLICATIONS

Full text of "Canon BJC-50 Service Manual", Apr. 1998, < https://archive.org/stream/printermanual-canon-bjc-50-service-manual/canonbjc-50servicemanual_djvu.txt >.

(Continued)

*Primary Examiner* — Julian D Huffman
(74) *Attorney, Agent, or Firm* — Tong Rea Bentley & Kim LLC (57) ABSTRACT

In an example, an apparatus is described that a fluid ejection device to dispense fluid. A local service controller controls dispensing of the fluid by the fluid ejection device under a direction of a fluid ejection controller. The local service controller also initiates, autonomously of the fluid ejection controller, capping of the fluid ejection device in response to the detection of a failure condition by the local service controller. Capping mechanics are provided to cap the fluid ejection device under the direction of the local service controller.

20 Claims, 4 Drawing Sheets

(56) References Cited

U.S. PATENT DOCUMENTS

2006/0103707 A1    5/2006  Askeland et al.
2008/0030540 A1    2/2008  Suzuki
2012/0293573 A1   11/2012  Walker et al.
2016/0059601 A1*   3/2016  Arimori ................ B41J 29/393
                                                              347/19

FOREIGN PATENT DOCUMENTS

| EP | 1057652 | 12/2000 |
| JP | 4220351 | 8/1992 |
| JP | 2006192649 | 7/2006 |
| JP | 2006341555 | 12/2006 |
| JP | 2010167618 | 8/2010 |
| WO | WO-2016018323 | 2/2016 |

OTHER PUBLICATIONS

Technology-iTech features ARE the Domino Difference, 2016, < https://www.dominodigitalprinting.com/technology >.

* cited by examiner

FLUID EJECTION DEVICE CAPPING

BACKGROUND

Web presses are printing devices that are commonly used for long-run print jobs, e.g., print jobs in excess of ten or twenty thousand impressions such as newspapers, magazines, books, catalogs, and the like. A web (or roll) of a substrate (e.g., paper, polymer, textile, or other substrate) is fed into the press, and an image in fluid is then printed on the web in a continuous manner as the web is fed through the press.

DETAILED DESCRIPTION

The present disclosure broadly describes an apparatus, method, and non-transitory computer-readable medium for automatically capping a fluid ejection device (e.g., a print head) of a fluid ejection system (e.g., web press) in response to the detection of a failure condition of the fluid ejection system. When the fluid ejection dies (e.g., pens) of a fluid ejection device are left uncapped during periods of inactivity, the fluid contained in the fluid ejection dies may dry out in and around the nozzles of the fluid ejection dies, which may, in turn adversely affect the quality of subsequent print output. Thus, some fluid ejection controllers may, after a threshold period of inactivity, initiate capping of the fluid ejection system's fluid ejection devices, e.g., by issuing a command that is executed independently for each fluid ejection array (e.g., print bar) or by a local service controller and capping mechanics (e.g., actuated by air or other means). However, under certain conditions, it may not be possible to carry out the capping in this way. For instance, if communication between the fluid ejection controller and the local service controllers is lost, the local service controllers will not receive the capping command. As another example, if electrical power to the fluid ejection system is lost, there may be no power to actuate the capping mechanics.

Examples of the present disclosure facilitate the automatic capping of fluid ejection dies in idle fluid ejection devices in response to fluid ejection system failure conditions by configuring the local service controllers of the fluid ejection arrays (e.g., print bars) to detect failure conditions. When a failure condition is detected, the local service controllers may autonomously (i.e., without direction from the fluid ejection controller) and independently initiate capping of their respective fluid ejection devices. The fluid ejection devices may then remain capped until the failure condition is resolved and operation of the fluid ejection system can resume. In some examples, the capping mechanisms may be provided with backup power (e.g., continuous backup power or uninterruptible power supply (UPS) power) and a reserve supply of the actuation means (e.g., pressurized air) used to actuate the capping mechanics.

Although examples of the disclosure may be discussed within the context of a web press as the fluid ejection system, the automatic capping methods and mechanisms disclosed herein may be further applied to automatically cap the fluid ejection devices of other types of fluid ejection systems, including three dimensional printing devices and other devices that eject fluid such as printing fluid (e.g., ink, toner, or the like) or detailing agents (e.g., binder materials, powders, or the like) used in additive manufacturing processes.

Figure 1:
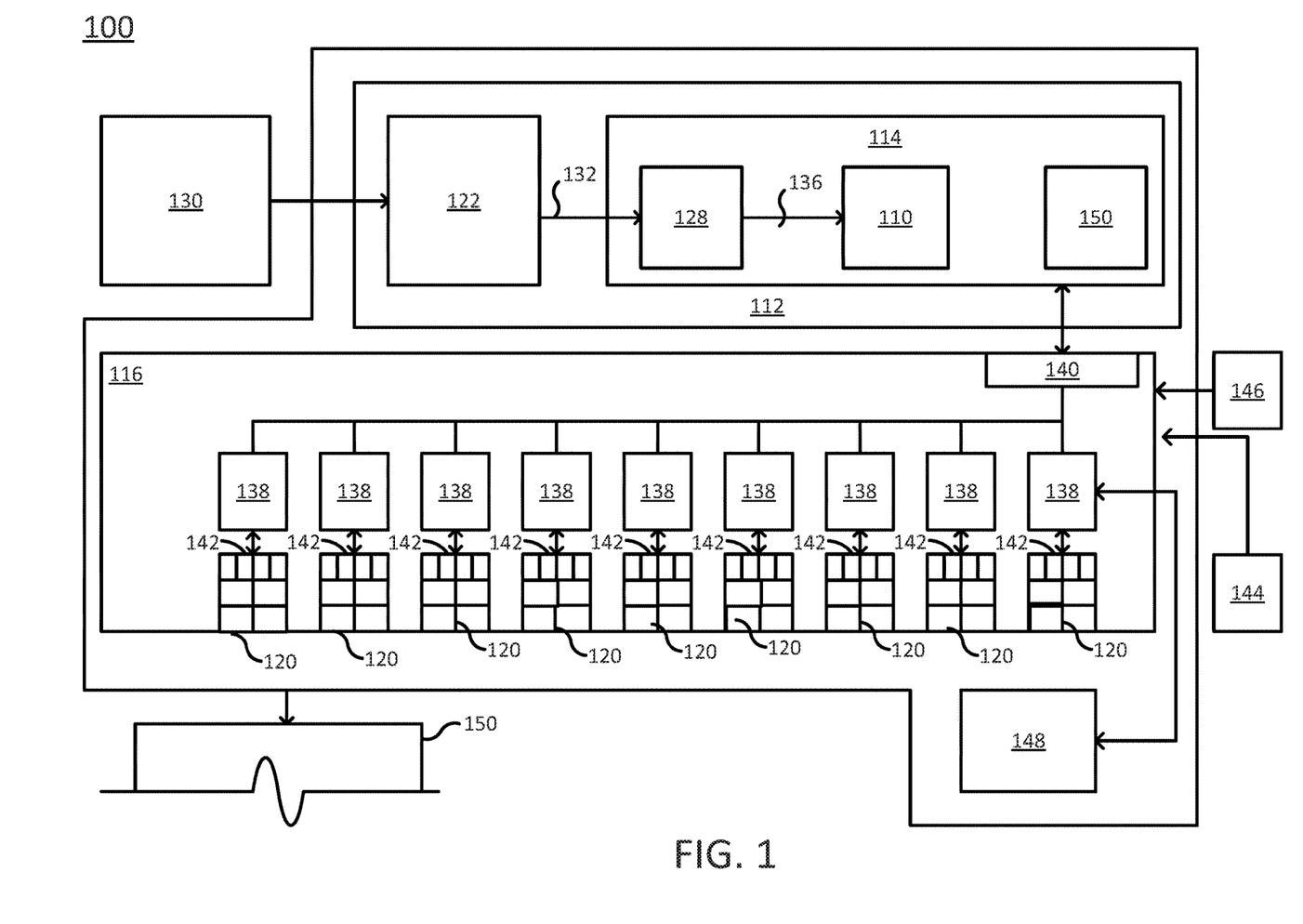
FIG. 1 illustrates an example system of the present disclosure.

FIG. 1 illustrates an example system 100 of the present disclosure. In one example, the system 100 is a web press. The system 100 generally includes an image processing system 112 and a control engine 116. The image processing system 112 and control engine 116 work together to eject fluid 130 (which may include images, text, or other graphics) onto a substrate 150. In some examples, the substrate may correspond to a web 150 that is fed through the system 100, and ejection of the fluid may cause formation of an image on the web.

In one example, the image processing system 112 further comprises a raster image processor (RIP) 122 and a fluid ejection controller 114. The RIP 122 converts the page description language (PDL) describing the original image data 130 to rasterized (e.g., pixelated) image data 132. The RIP 122 may include various subcomponents for performing operations such as generating continuous tone (or "contone") rasterized image data and other functions. Any such subcomponents may be implemented as distinct programming elements or as parts of an integrated program or programming element to perform specified functions. Furthermore, any such subcomponents may include a processor and/or other electronic circuitry and components to execute the programming (i.e., executable instructions) to perform the specified functions. In some examples, such subcomponents may comprise a combination of hardware and programming to implement the functionalities of the subcomponents.

The fluid ejection controller 114 may include a halftoning module 128 and a colors-to-fluid conversion module 110. In another example, the halftoning module 128 may reside on the RIP 122 as a subcomponent of the RIP 122. In one example, the fluid ejection controller 114 may further include a capping module 150.

The halftoning module 128 receives the contone rasterized image data 132 and converts it to halftone data 136. Conversion to halftone data 136 includes approximating continuous tone colors with a limited number of available discrete colors. For instance, the colors that the system 100 cannot print directly may be simulated using patterns of pixels in the colors that are available. The halftoning module 128 may perform any one or more halftoning techniques to perform this conversion.

The colors-to-fluid conversion module 110 receives the halftone data 136 and maps the halftone data 136 to drops of fluid to be generated by the fluid ejection devices 120. This information may be used to drive the fluid ejection devices 120 to produce, for example, a printed image.

The capping module 150 detects when the system 100 is idle and issues a command to the local service controllers 138 of the control engine 116 to cap the fluid ejection devices 120, so that the fluid contained in the fluid ejection devices 120 does not dry up. The capping module 150 may similarly issue a command to the local service controllers 138 to uncap the fluid ejection devices 120 when the system 100 is readying to print.

Any or all of the halftoning module 128, the colors-to-fluid conversion module 110, and the capping module 150 may be implemented as a distinct programming element or as part of an integrated program or programming element to perform specified functions. Furthermore, any or all of the halftoning module 128, the colors-to-fluid conversion module 110, and the capping module 150 may include a processor and/or other electronic circuitry and components to execute the programming (i.e., executable instructions) to perform the specified functions.

Moreover, although the fluid ejection controller 114 is illustrated as an internal component of the system 100, some printer controller functions may be performed outside of the system 100. Thus, the system illustrated in FIG. 1 shows only one example configuration that may be used to implement the functionality of the halftoning module 128, the colors-to-fluid conversion module 110, and the capping module 150.

In one example, the control engine 116 is implemented as a modular fluid ejection array (e.g., print bar). Each individual fluid ejection array includes a plurality of fluid ejection devices (e.g., print heads) 120 and is controlled by a respective local service controller 138. The fluid ejection devices 120 may be of the type used in high-speed commercial web presses. For instance, the fluid ejection devices 120 may each include a plurality of fluid ejection dies (e.g., pens) that dispense fluid (e.g., printing fluid such as ink or toner, or a detailing agent such as those used in additive manufacturing processes). In one example, the fluid ejection devices 120 are driven by the halftone data 136 produced by the halftoning module 128, for instance at one or two bits of data per pixel in each color plane. In this example, the fluid ejection controller 114 passes instructions to the control engine 116 via a fluid ejection array interface 140. Each fluid ejection array may further include a respective capping mechanics 142 for capping the fluid ejection devices 120 when the system 100 is idle. In one example, the capping mechanics 142 are air actuated; however, in other examples, the capping mechanics 142 may be actuated by other means.

In one example, the local service controllers 138 are coupled in series, enabling the local service controllers 138 to communicate with each other. Furthermore, one of the local service controllers 138 may be designated as a primary or coordinating local service controller that initiates and coordinates the actions of all of the local service controllers 138 when the fluid ejection devices 120 are to be capped. The primary local service controller 138 may be coupled to a voltage monitor 148 that allows the primary local service controller 138 to detect when electrical power is available to the system 100.

In one example, the control engine 116 further includes a backup power source 144 and a reserve 146 of actuation means. The backup power source 144 and the reserve 146 are both provided to facilitate operation of the capping mechanics 142 in the event that electrical power (e.g., delivered via a primary source of electrical power, such as mains electric power) to the system 100 is lost. Thus, the backup power source 144 may comprise, for example, a continuous backup power source or a UPS that provides sufficient power for a sufficient length of time to complete capping operations (and possible any other servicing being performed by the control engine 116. Thus, the backup power source 144 may provide power to the local service controllers 138, as well as to any mechanics (e.g., motors, solenoid valves, sensors, or the like) that perform the capping operations, when electrical power to the system 100 is lost. Use of the backup power source 144 may be discontinued once electrical power to the system 100 is restored. The reserve 146 may contain a supply of pressurized air in the event that that capping mechanics 142 are air actuated, or may comprise a supply of some other substance in the event that the capping mechanics 142 are actuated by other means.

Figure 2:
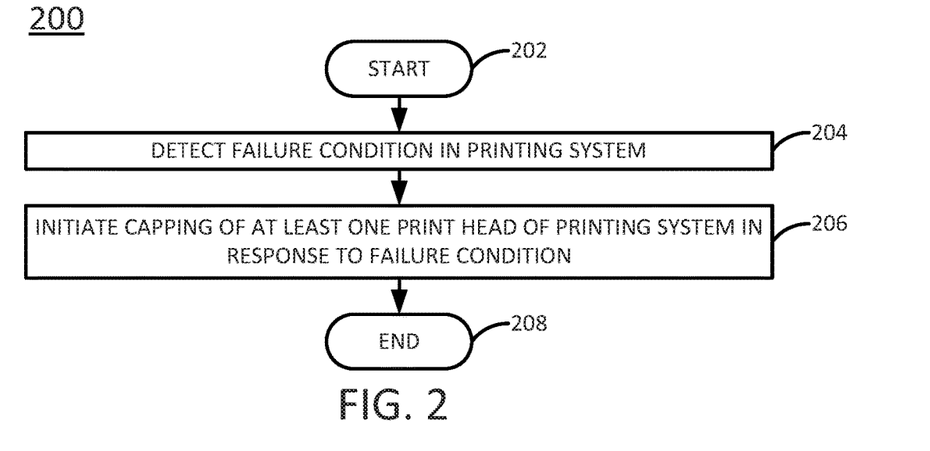
FIG. 2 illustrates a flowchart of a first example method for automatically capping a fluid ejection device in response to the detection of a fluid ejection system failure condition.

FIG. 2 illustrates a flowchart of a first example method 200 for automatically capping a fluid ejection device in response to the detection of a fluid ejection system failure condition. The method 200 may be performed, for example, by one of the local service controllers 138 of the system 100. As such, reference is made in the discussion of FIG. 2 to various components of the system 100 to facilitate understanding. However, the method 200 is not limited to implementation with the system illustrated in FIG. 1.

The method 200 begins in block 202. In block 204, a local service controller 138 detects a failure condition in the system 100. In one example, the failure condition may be a loss of electrical power to the system 100. In this case, the local service controller 138 may be a primary local service controller that detects the loss of power by monitoring the status of the voltage monitor 148. In another example, the failure condition may be a loss of communication between the local service monitor 138 and the fluid ejection controller 114. In this case, the local service controller 138 may be any of the local service controllers 138 of the system 100.

In block 206 (illustrated in phantom), the local service controller 138 initiates capping of at least some of the fluid ejection devices 120 of the system 100 in response to the detection of the failure condition. In the event that the local service controller 138 is a primary local service controller and the failure condition is a loss of electrical power to the system 100, initiating the capping event may involve not only capping of the local service controller's respective fluid ejection device 120, but also issuing a command to one or more of the other local service controllers 138 to cap their respective fluid ejection devices 120. In the event that the failure condition is a loss of communication between the local service monitor 138 and the fluid ejection controller 114, the local service controller 138 may initiate capping the local service controller's respective fluid ejection device 120 without commanding any of the other local service controllers to take action.

The method 200 ends in block 208. The local service controller 138 may then enter an idle mode (e.g., in which its servicing and capping mechanisms are maintained in their current, post-capping states) until the fault condition is corrected. Once the fault condition is corrected, the local service controller 138 may resume its normal (i.e., non-fault condition) operating mode.

Figure 3:
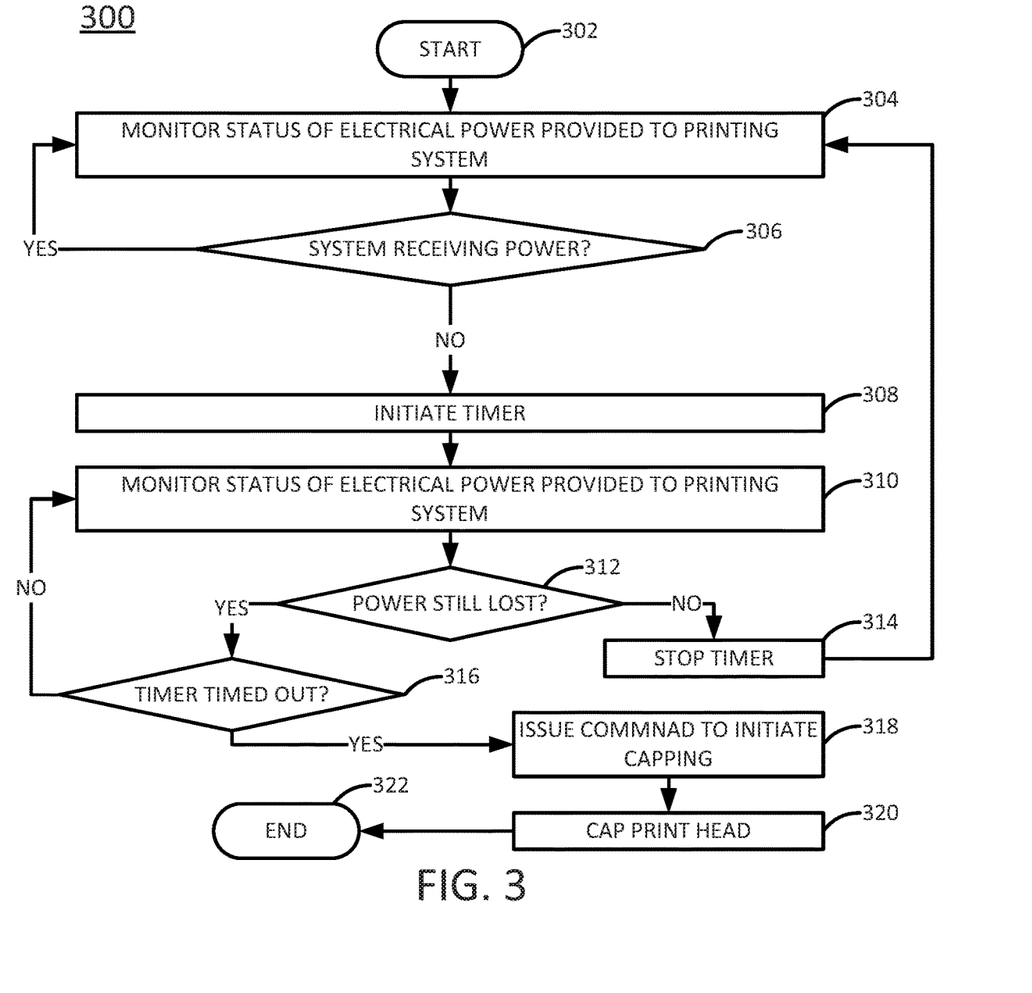
FIG. 3 illustrates a flowchart of a second example method for automatically capping a fluid ejection device in response to the detection of a fluid ejection system failure condition.

FIG. 3 illustrates a flowchart of a second example method 300 for automatically capping a fluid ejection device in response to the detection of a fluid ejection system failure condition. In particular, the method 300 describes a method for automatically capping a fluid ejection device in the event of a loss of electrical power to a printing system 100. Thus, the method 300 may be performed, for example, by the one of the local service controllers 138 of the system 100, acting as a primary local service controller. As such, reference is made in the discussion of FIG. 3 to various components of the system 100 to facilitate understanding. However, the method 300 is not limited to implementation with the system illustrated in FIG. 1.

The method 300 begins in block 302. In block 304, the primary local service controller 138 monitors the system 100 to verify that the system 100 is receiving electrical power. In one example, this involves monitoring the status of the voltage monitor 148, which the primary local service controller 138 may query on a periodic, irregular, continuous, or event-triggered basis.

In block 306, the primary local service controller 138 determines whether the system 100 is receiving electrical power, e.g., based on the monitoring. If the primary local service controller 138 concludes in block 306 that the system 100 is receiving electrical power, then the method 300 returns to block 304, and the primary local service controller 138 continues to monitor the system 100.

If, on the other hand, the primary local service controller 138 concludes in block 306 that the system 100 is not receiving electrical power, then the method 300 proceeds to block 308. In block 308, the primary local service controller 138 initiates a local timer. In one example, the local timer is initiated to count down a predefined interval of time (e.g., x seconds).

In block 310, the primary local service controller 138 continues to monitor the system 100, e.g., to determine if/when the electrical power is restored (e.g., by monitoring the status of the voltage monitor 148).

In block 312, the primary local service controller 138 determines whether the power is still lost. If the primary local service controller 138 concludes in block 312 that the power is no longer lost (i.e., has been restored), then the method 300 proceeds to block 314, and the primary local service controller 138 stops the timer. The method 300 then returns to block 304, and the primary local service controller 138 continues to monitor the system 100.

If, on the other hand, the primary local service controller 138 concludes in block 312 that the power is still lost (i.e., has not been restored), then the method 300 proceeds to block 316. In block 316, the primary local service controller 138 determines whether the timer has timed out.

If the primary local service controller 138 concludes in block 316 that the timer has not timed out, then the method 300 returns to block 310 and continues to monitor the system 100.

If, on the other hand, the primary local service controller 138 concludes in block 316 that the timer has timed out, then the method 300 proceeds to block 318. In block 318, the primary local service controller 138 issues a command to at least one other local service controller 138 instructing the at least one other local service controller 138 to cap its respective fluid ejection device 120.

In block 320, the primary local service controller 138 caps its own fluid ejection device 120. This may involve engaging the backup power source 144 and/or reserve 146 of actuation means in order to actuate the capping mechanism for the fluid ejection device 120. For instance, the backup power source 144 may be engaged to power a motor to raise or lower the fluid ejection array to a position at which the fluid ejection device 120 can be capped, while the reserve 146 of actuation means may be engaged to drive the actuating mechanism for positioning the caps in place. The primary local service controller 138 may read one or more sensor states and/or control motors or valves during this process in order to make sure that the fluid ejection device 120 is properly capped.

The method 300 ends in block 322. The primary local service controller 138 may then enter an idle mode (e.g., in which its servicing and capping mechanisms are maintained in their current, post-capping states) until electrical power to the system 100 is restored. Once electrical power has been restored, the primary local service controller 138 may resume its normal (i.e., non-fault condition) operating mode.

Figure 4:
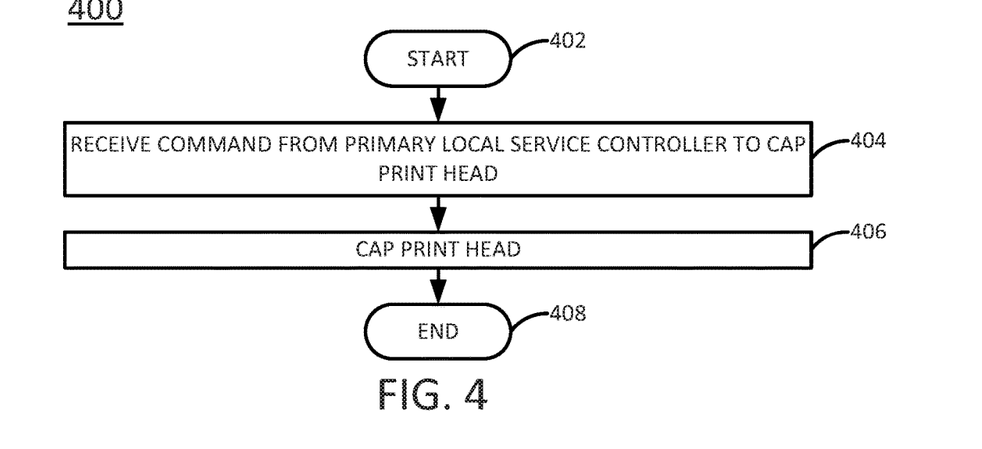
FIG. 4 illustrates a flowchart of a third example method for automatically capping a fluid ejection device in response to the detection of a fluid ejection system failure condition.

FIG. 4 illustrates a flowchart of a third example method 400 for automatically capping a fluid ejection device in response to the detection of a fluid ejection system failure condition. In particular, the method 400 describes a method for automatically capping a fluid ejection device in the event of a loss of electrical power to a printing system 100. In this case, the method 400 may be performed, for example, by the one of the local service controllers 138 of the system 100 which is not a primary local service controller. Thus, the method 400 may operate in conjunction with the method 300 described above. As such, reference is made in the discussion of FIG. 4 to various components of the system 100 to facilitate understanding. However, the method 400 is not limited to implementation with the system illustrated in FIG. 1.

The method 400 begins in block 402. In block 404, the local service controller 138 receives a command from the primary local service controller 138 to initiate capping of the local service controller's fluid ejection device 120. The command may be received directly from the primary local service controller 138, or may be received directly from another, non-primary local service controller 138 after propagating from the primary local service controller 138.

In block 406, the local service controller 138 caps its fluid ejection device 120. This may involve engaging the backup power source 144 and/or reserve 146 of actuation means in order to actuate the capping mechanism for the fluid ejection device 120. For instance, the backup power source 144 may be engaged to power a motor to raise or lower the fluid ejection array to a position at which the fluid ejection device 120 can be capped, while the reserve 146 of actuation means may be engaged to drive the actuating mechanism for positioning the caps in place. The local service controller 138 may read one or more sensor states and/or control motors or valves during this process in order to make sure that the fluid ejection device 120 is properly capped.

In one example, if the command received in block 404 is received while the local service controller 138 is in the process of executing another service routine, then the local service controller 138 may first complete the service routine before proceeding to block 406.

The method 400 ends in block 408. The local service controller 138 may then enter an idle mode (e.g., in which its servicing and capping mechanisms are maintained in their current, post-capping states) until electrical power to the system 100 is restored. Once electrical power has been restored, the local service controller 138 may resume its normal (i.e., non-fault condition) operating mode.

Figure 5:
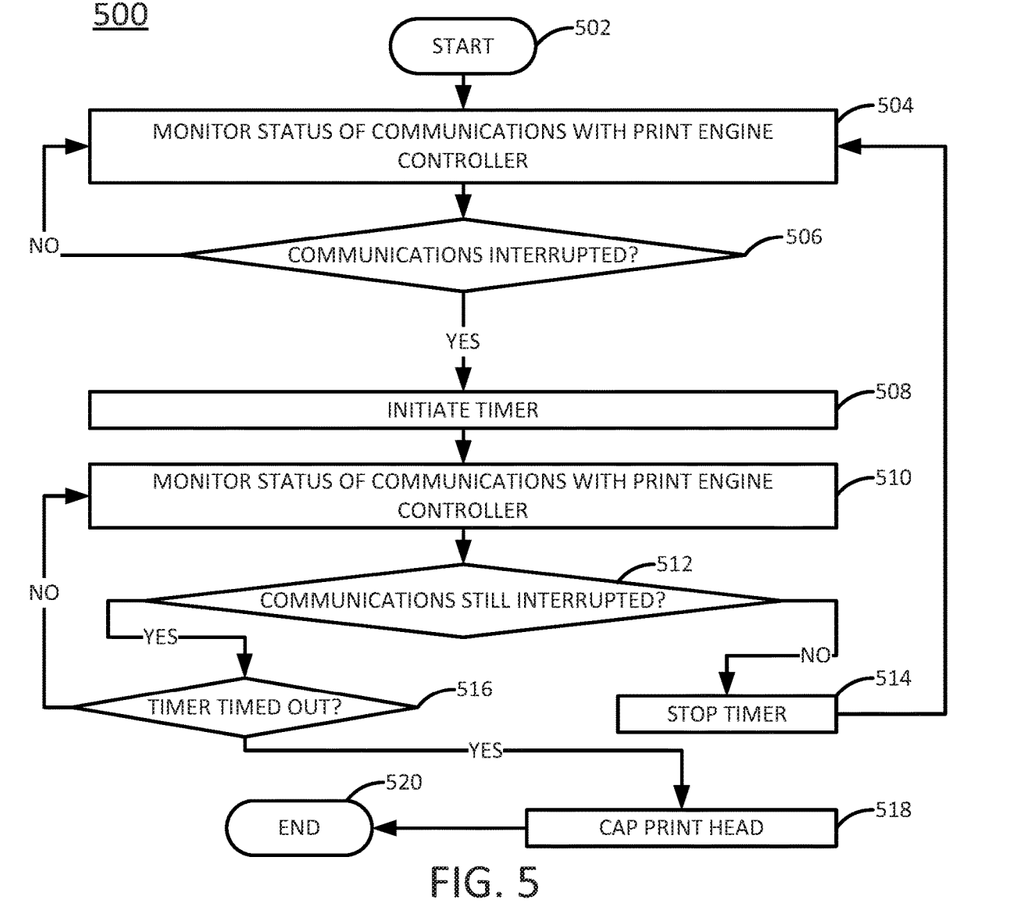
FIG. 5 illustrates a flowchart of a fourth example method for automatically capping a fluid ejection device in response to the detection of a fluid ejection system failure condition.

FIG. 5 illustrates a flowchart of a fourth example method 500 for automatically capping a fluid ejection device in response to the detection of a fluid ejection system failure condition. In particular, the method 500 describes a method for automatically capping a fluid ejection device in the event of a loss of communication between a fluid ejection controller of a printing system and a local service controller of a fluid ejection device of the printing system. Thus, the method 500 may be performed, for example, by the one of the local service controllers 138 of the system 100. As such, reference is made in the discussion of FIG. 5 to various components of the system 100 to facilitate understanding.

However, the method 500 is not limited to implementation with the system illustrated in FIG. 1.

The method 500 begins in block 502. In block 504, the local service controller 138 monitors the status of its communications with the fluid ejection controller 114 to verify that the communications have not been interrupted. For instance, the fluid ejection controller 114 may send periodic (e.g., every x seconds) messages to the local service controller 138 to confirm that communications are intact. If the local service controller 138 has not received a message from the fluid ejection controller 114 in more than a threshold period of time (e.g., more than x seconds, or x seconds plus some margin of time), then the local service controller 138 may conclude that communications have been interrupted.

In block 506, the local service controller 138 determines whether communications with the fluid ejection controller 114 have been interrupted, e.g., based on the monitoring. If the local service controller 138 concludes in block 506 that the communications have not been interrupted, then the method 500 returns to block 504, and the local service controller 138 continues to monitor the status of the communications with the fluid ejection controller 114.

If, on the other hand, the local service controller 138 concludes in block 506 that communications have been interrupted, then the method 500 proceeds to block 508. In block 508, the local service controller 138 initiates a local timer. In one example, the local timer is initiated to count down a predefined interval of time (e.g., x seconds).

In block 510, the local service controller 138 continues to monitor the status of communications with the fluid ejection controller 114, e.g., to determine if/when communications with the fluid ejection controller 114 are restored (e.g., by sending test messages to the fluid ejection controller 114).

In block 512, the local service controller 138 determines whether the communications with the fluid ejection controller 114 are still interrupted. If the local service controller 138 concludes in block 512 that the communications with the fluid ejection controller 114 are no longer interrupted (i.e., have been restored), then the method 500 proceeds to block 514, and the local service controller 138 stops the timer. The method 500 then returns to block 504, and the local service controller 138 continues to monitor the status of communications with the fluid ejection controller 114.

If, on the other hand, the local service controller 138 concludes in block 512 that the communications with the fluid ejection controller 114 are still interrupted (i.e., have not been restored), then the method 500 proceeds to block 516. In block 516, the local service controller 138 determines whether the timer has timed out.

If the local service controller 138 concludes in block 516 that the timer has not timed out, then the method 500 returns to block 510 and continues to monitor the status of communications with the fluid ejection controller 114.

If, on the other hand, the local service controller 138 concludes in block 516 that the timer has timed out, then the method 500 proceeds to block 518. In block 518, the primary local service controller 138 caps its fluid ejection device 120. The local service controller 138 may read one or more sensor states and/or control motors or valves during this process in order to make sure that the fluid ejection device 120 is properly capped.

The method 500 ends in block 520. The local service controller 138 may then enter an idle mode (e.g., in which its servicing and capping mechanisms are maintained in their current, post-capping states) until communications between the local service controller 138 and the fluid ejection controller 114 are restored. Once communications have been restored, the local service controller 138 may resume its normal (i.e., non-fault condition) operating mode.

In one example, if an emergency stop mechanism (e.g., an emergency stop button is pushed, or a restricted guard door of the system 100 is opened to potentially expose moving parts) is activated during operation of any of the methods 200, 300, 400, or 500, the activation of the emergency stop mechanism will be detected by a safety system of the system 100. In this case, communications between the safety system and the system's power source (e.g., primary or backup) will be shut down, resulting in a halt to the capping operations (and any other operations).

The methods 200, 300, 400, and 500 thus enable the local service controllers 138 to perform capping operations autonomously (i.e., without direction from the fluid ejection controller 114) and independently of each other. Thus, the fluid ejection devices 120 can be capped even when communication is lost between local service controllers 138 or between a local service controller 138 and the fluid ejection controller 114.

It should be noted that although not explicitly specified, some of the blocks, functions, or operations of the methods 200, 300, 400, or 500 described above may include storing, displaying and/or outputting for a particular application. In other words, any data, records, fields, and/or intermediate results discussed in the methods can be stored, displayed, and/or outputted to another device depending on the particular application. Furthermore, blocks, functions, or operations in FIGS. 2-5 that recite a determining operation, or involve a decision, do not necessarily imply that both branches of the determining operation are practiced. In other words, one of the branches of the determining operation can be deemed to be optional.

Figure 6:
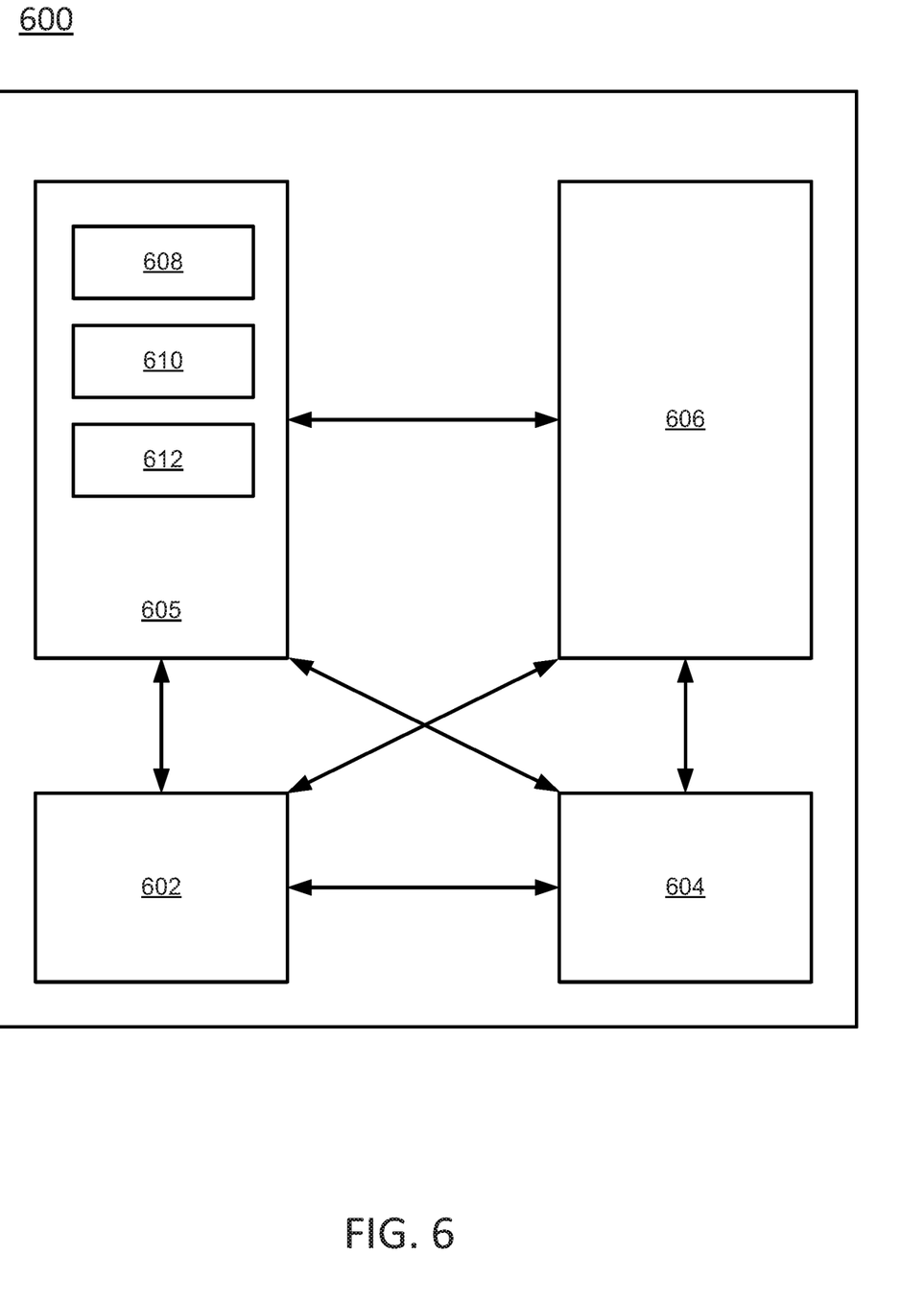
FIG. 6 depicts a high-level block diagram of an example computer that can be transformed into a machine capable of performing the functions described herein.

FIG. 6 depicts a high-level block diagram of an example computer 600 that can be transformed into a machine capable of performing the functions described herein. Examples of the present disclosure modify the operation and functioning of the general-purpose computer to cap a fluid ejection device of a fluid ejection system in response to the detection of a fluid ejection system failure condition, as disclosed herein. One or more of the local service controllers 138 of FIG. 1 may be configured as illustrated in FIG. 6 in order to carry out operations for automatically capping a fluid ejection device in response to a failure condition of a printing system.

As depicted in FIG. 6, the computer 600 comprises a hardware processor element 602, e.g., a central processing unit (CPU), a microprocessor, or a multi-core processor, a memory 604, e.g., random access memory (RAM) and/or read only memory (ROM), a module 605 for automatically capping a fluid ejection device, and various input/output devices 606, e.g., storage devices, including but not limited to, a tape drive, a floppy drive, a hard disk drive or a compact disk drive, a receiver, a transmitter, a speaker, a display, a speech synthesizer, an output port, an input port, a sensor, or a user input device, such as a keyboard, a keypad, a mouse, a microphone, and the like. Although one processor element is shown, it should be noted that the computer 600 may employ a plurality of processor elements. Furthermore, although one computer 600 is shown in the figure, if the methods 200, 300, 400, and 500 as discussed above are implemented in a distributed or parallel manner for a particular illustrative example, i.e., the blocks of the methods 200, 300, 400, and 500 or the entire methods 200, 300, 400, and 500 are implemented across multiple or parallel computers, then the computer 600 of this figure is intended to represent each of those multiple computers. Furthermore, a hardware processor can be utilized in supporting a virtualized or shared computing environment. The virtualized computing environment may support a virtual machine representing computers, servers, or other computing devices. In such virtualized virtual machines, hardware components such as hardware processors and computer-readable storage devices may be virtualized or logically represented.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the methods 200, 300, 400, and 500 discussed above can be used to configure a hardware processor to perform the blocks, functions and/or operations of the above disclosed methods 200, 300, 400, and 500.

In one example, instructions and data for the present module or process 605 for automatically capping a fluid ejection device, e.g., machine readable instructions can be loaded into memory 604 and executed by hardware processor element 602 to implement the blocks, functions or operations as discussed above in connection with the methods 200, 300, 400, and 500. For instance, the module 605 may include a plurality of programming code components, including a detector component 608, a capping component 610, and a communication component 612.

The detector component 608 may be configured to detect a failure condition of a printing system, such as a general loss of electrical power or a loss of communication between a fluid ejection controller and a local service controller of a fluid ejection device. For instance, the detector component 608 may be configured to perform all or part of blocks 204, 304-314, 404, or 504-516 of the methods 200, 300, 400, and 500 described above.

The capping component 610 may be configured to engage the necessary mechanisms to initiate automatic capping of a fluid ejection device associated with a local service controller. For instance, the capping component 610 may be configured to perform blocks 206, 320, 406, or 518 of the methods 200, 300, 400, and 500 described above.

The communication component 612 may be configured to send commands relating to the capping of fluid ejection devices. For instance, the capping component 612 may be configured to perform block 318 of the method 300 described above.

Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described methods 200, 300, 400, and 500 can be perceived as a programmed processor or a specialized processor. As such, the present module 605 for automatically capping a fluid ejection device, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. An apparatus, comprising:
a plurality of fluid ejection devices to dispense fluid;
a plurality of local service controllers, wherein each local service controller of the plurality of local service controllers is to control dispensing of the fluid by a respective fluid ejection device of the plurality of fluid ejection devices under a direction of a fluid ejection controller and to initiate, autonomously of the fluid ejection controller, capping of the respective fluid ejection device in response to a detection of a failure condition by at least one local service controller of the plurality of local service controllers; and
a plurality of capping mechanics, wherein each capping mechanics of the plurality of capping mechanics is to cap a respective fluid ejection device of the plurality of fluid ejection devices under a direction of a respective local service controller of the plurality of local service controllers.

2. The apparatus of claim 1, further comprising:
a backup power source to provide the plurality of local service controllers and the plurality of capping mechanics with power to initiate capping of the plurality of fluid ejection devices when the failure condition is a loss of primary electrical power.

3. The apparatus of claim 2, further comprising:
a reserve of a means used to actuate the plurality of capping mechanics to provide the means when the failure condition is the loss of primary electrical power.

4. The apparatus of claim 2, further comprising:
a voltage monitor coupled to the at least one local service controller for providing an indication as to a status of the primary electrical power.

5. The apparatus of claim 1, wherein the apparatus is a web press.

6. The apparatus of claim 1, wherein the plurality of local service controllers is coupled to allow the plurality of local service controllers to communicate with each other.

7. The apparatus of claim 6, wherein the plurality of local service controllers is coupled in series.

8. A method, comprising:
detecting, by a local service controller of a plurality of local service controllers that are communicatively coupled to each other, a failure condition in a printing system, wherein each local service controller of the plurality of local service controllers controls dispensing of fluid by a respective fluid ejection device of the printing system; and
initiating, by the local service controller acting autonomously of a fluid ejection controller that controls the plurality of local service controllers, capping of the respective fluid ejection device in response to the detecting.

9. The method of claim 8, further comprising:
issuing a command by the local service controller to another local service controller of the plurality of local service controllers to initiate capping of the respective fluid ejection device that is controlled by the another local service controller.

10. The method of claim 8, wherein the failure condition is a loss of primary electrical power to the printing system.

11. The method of claim 10, wherein the detecting comprises:
initiating a timer upon determining that the primary electrical power is unavailable.

12. The method of claim 11, wherein the initiating comprises:
engaging capping mechanics of the respective fluid ejection device when the primary electrical power is still unavailable after the timer times out.

13. The method of claim 8, wherein the failure condition is a loss of communication between the local service controller and the fluid ejection controller.

14. The method of claim 13, wherein the detecting comprises:
initiating a timer upon determining that the communication is lost.

15. The method of claim 14, wherein the initiating comprises:
engaging capping mechanics of the respective fluid ejection device when the communication is still lost after the timer times out.

16. The method of claim 8, wherein the plurality of local service controllers is coupled in series.

17. An apparatus, comprising:
a plurality of fluid ejection devices to eject fluid;
a plurality of controllers, wherein each controller of the plurality of controllers is to control ejection of the fluid by a respective fluid ejection device of the plurality of fluid ejection devices;
a fluid ejection controller to provide instructions to the plurality of controllers to initiate ejection of the fluid;
wherein the fluid ejection controller communicates along a first communication path between the fluid ejection controller and the plurality of controllers, to deliver the instructions to provide confirmation that communications between the apparatus and the fluid ejection controller are intact; and
wherein the plurality of controllers communicate along a second communication path between the plurality of controllers, to send instructions to a plurality of capping mechanisms to cap a respective fluid ejection device of the plurality of fluid ejection devices when the communications between the apparatus and the fluid ejection controller are not intact.

18. The apparatus of claim 17, further comprising:
a third communication path between at least one controller of the plurality of controllers and a voltage monitor, to provide confirmation that the apparatus is receiving electrical power.

19. The apparatus of claim 17, wherein the plurality of controllers is coupled to allow the plurality of controllers to communicate with each other.

20. The apparatus of claim 19, wherein the plurality of controllers is coupled in series.

* * * * *